April 23, 1940. L. E. LOVETT 2,197,805
DIALYZING DIAPHRAGM AND PROCESS OF MAKING THE SAME
Filed July 29, 1938
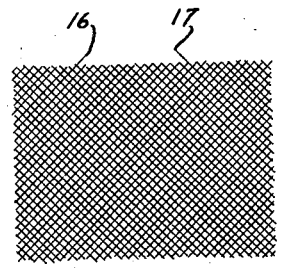
FIG 1
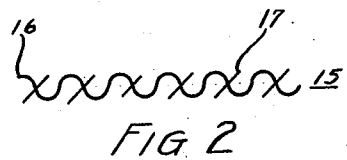
FIG 2
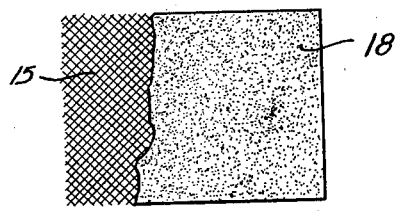
FIG 3
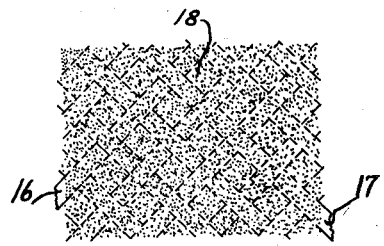
FIG 4
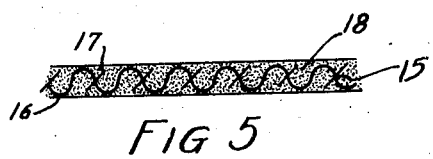
FIG 5
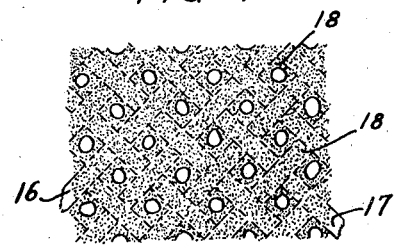
FIG 6
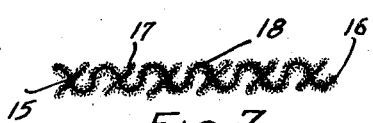
FIG 7
FIG 8
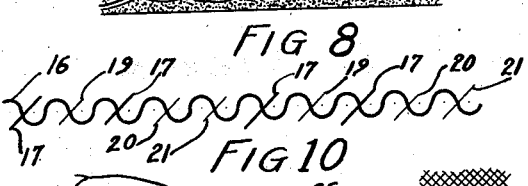
FIG 10
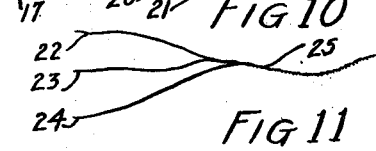
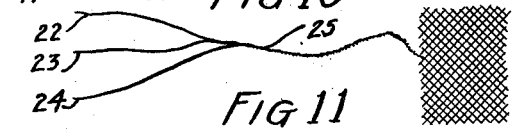
FIG 11
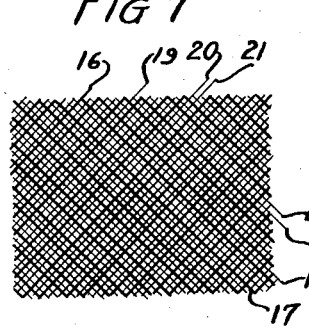
FIG 9
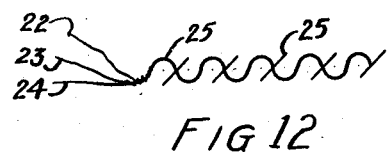
FIG 12
INVENTOR.
LOUIS E. LOVETT
BY Woodling and Krost
ATTORNEY.

Patented Apr. 23, 1940

2,197,805

UNITED STATES PATENT OFFICE 2,197,805

DIALYZING DIAPHRAGMS AND PROCESS OF MAKING THE SAME

Louis E. Lovett, Cleveland Heights, Ohio

Application July 29, 1938, Serial No. 222,031

6 Claims. (Cl. 23—252)

My invention relates to diaphragms and more particularly to diaphragms for dialysis of colloidal solutions.

While dialysis has been practiced in experimental laboratories for many years, it is only recently that commercial use and development of dialysis has been made. This commercial development has been particularly utilized in the rayon and related industries in which used sodium hydroxide is salvaged by the removal of hemicellulose and impurities in the colloidal state. In experimental laboratories, animal membranes such as pig's bladder or parchment have been used but this has only a limited application due to the small size of the said membranes, the imperfections and lack of uniformity therein, the physical weakness of the membranes, the chemical decomposition of the membranes by the chemical action of many types of colloidal solutions, and other well known defects. Laboratories have also experimented with diaphragms formed by precipitating certain substances such as copper ferrocyanide to form a membrane upon the surface of porous crockery, but this also has many disadvantages and is inapplicable to commercial use. Pores of crockery lack uniformity in size and distribution and as a result certain parts of the crockery bear more pressure than others and the deposited membrane is ruptured at that spot. Such a prepared piece of crockery at best is inapplicable to commercial dialysis to permit a continuous purification with efficiency.

There have been some commercial dialyzing diaphragms made of a fabric of vegetable fibers such as cotton, as described in the United States Patent to Cerini, No. 1,815,761. However, such diaphragms composed solely of vegetable or animal fibers have many serious objections in commercial practice. They cannot be universally used as many colloidal solutions to be dialyzed chemically attack the fibers and cause rapid decomposition of them. Even when treated by the Cerini process the fibers may become chemically decomposed by the colloidal solution being dialyzed and the diaphragm loses its efficiency and strength. Animal and vegetable fibers have relatively little strength and diaphragms made of fabric of animal or vegetable fibers are rather weak. This lack of strength is a serious objection to the commercial use of such diaphragms in dialysis. After any extended use of cotton or wool fabric the fibers become weak and due to the differences in pressures during dialysis the diaphragm is ruptured. The replacement of dialyzing diaphragms is not only expensive and laborious but also interrupts the dialyzing process being conducted.

Dialyzers are made in several well known forms and the dialyzing diaphragm may be arranged in any suitable shape. In most commercial dialyzers the diaphragm is in the shape of a bag or sac and is suspended in a container in which the dialyzing operation takes place. It is to be understood that the use of the word "diaphragm" in the description and claims includes any material through which dialysis takes place whether flat, or made into a sac, or any other suitable form.

It is an object of my invention to provide an improved dialyzing diaphragm having great strength and toughness.

It is another object to provide a thin flexible dialyzing diaphragm having great tensile strength.

It is another object to provide a diaphragm having a wide variety of uses in dialysis.

Another object is to provide a dialyzing diaphragm which may be used for dialyzing substantially all colloidal solutions other than those containing hydrofluoric acid.

Another object is to provide a dialyzing diaphragm having a frame work of strong flexible material.

Another object is to provide a dialyzing diaphragm of a thin sheet of inorganic material having uniformly distributed pores of substantially the same size and impermeable to the colloid of the colloidal solution to be dialyzed.

Another object is to provide a dialyzing diaphragm composed of a fabric of woven spun glass fibers.

Another object is to provide a flexible glass diaphragm having uniformly spaced pores impermeable to the colloid of a colloidal solution to be dialyzed.

Another object is to provide a frame work of woven spun glass fibers for supporting organic fibers interwoven therewith for dialysis of a colloidal solution.

Another object is to provide an improved thin flexible supporting frame work for a dialyzing membrane.

Another object is to provide a dialyzing diaphragm impermeable to the colloid of the colloidal solution to be dialyzed and resistant to the chemical action of said colloidal solution.

Another object is to provide a dialyzing diaphragm of a flexible inorganic fabric impregnated with a membrane forming material.

Another object is to provide a dialyzing diaphragm of glass fabric coated with a cellulosic material such as regenerated cellulose.

Another object is to provide a dialyzing diaphragm of glass fabric coated with a cellulosic material such as cellulose acetate or other cellulose derivative.

A still further object is to provide an improved method of making a dialyzing diaphragm.

And a still further object is to provide a method of treating a spun glass fabric diaphragm.

Other objects and a fuller understanding of my invention may be had by referring to the following description and claims, taken in conjunction with the accompanying drawing, in which:

Figure 1 illustrates a piece of fabric woven of spun glass fibers;

Figure 2 is a cross-section of the glass fabric shown in Figure 1;

Figure 3 illustrates a piece of glass fabric coated with membrane material, with a portion of the membrane material cut away;

Figure 4 illustrates the filling of the interstices of the fabric when the fabric is fully coated with the membrane material;

Figure 5 is a cross-section of the glass fabric shown in Figure 3 when filled with the coating as shown in Figure 4;

Figure 6 illustrates the partial filling of the interstices of the fabric when the fabric is coated to cover the threads with the membrane material;

Figure 7 is a cross-section of the glass fabric shown in Figure 3 when coated as shown in Figure 6;

Figure 8 diagrammatically illustrates the coating of each of the fibers of a thread of a fabric with the membrane material impregnated in the fabric;

Figure 9 illustrates a piece of fabric woven of glass threads and of organic threads;

Figure 10 is a cross-section of the fabric shown in Figure 9;

Figure 11 illustrates a fabric woven of thread containing both glass fibers and organic fibers; and Figure 12 is a cross-section of the fabric shown in Figure 11.

By reason of the nature of the invention the drawing is largely diagrammatic in nature and utilizes whenever possible the Patent Office symbols together with appropriate additions for illustrative purposes.

The preferred form of my diaphragm is constructed of a sheet of fabric which has been woven from threads of spun glass fibers. Such fabrics have been recently developed and are now commercially obtainable. The fabric chosen for a prescribed dialyzing operation is dependent upon the characteristics of the colloid and the colloidal solution to be dialyzed. In order to have interstices or pores therein of the proper size a glass fabric having the proper fineness of weave is selected. It may generally be said that the glass fabric suitable for dialysis is finely woven in order that the pores extending therethrough are minute enough to be impermeable to the colloid of the colloidal solution to be dialyzed. The interstices extending through the glass fabric are of substantially the same size and are uniformly distributed throughout the fabric by reason of the uniform weaving of the threads. Such a diaphragm of a fabric having uniformly distributed pores of substantially the same size provides for uniformity of the action of dialysis at all areas of the diaphragm. With substantially equal dialysis occurring throughout the diaphragm the osmotic pressure is uniformly maintained at all points. The minute pores of the fabric through which dialysis takes place are formed by the spaces between the individual fibers of each thread and also by the interstices equally spaced between the threads in the warp and the weft of the woven fabric. A fabric which has been found acceptable and suitable for most dialysis, such as for example, in the purification of sodium hydroxide in the rayon industry, has substantially the structure of an equivalent cotton count of a warp and a weft of 35 threads of No. 10 yarn per inch. Various changes in the structure may be made in weaving the fabric in order to obtain a diaphragm having the required pore construction for the dialysis of the specific colloidal solution to be dialyzed.

In Figures 1 and 2, there is shown by proper symbols a piece of fabric 15 having the threads 16 in the warp and threads 17 in the weft, the said threads being composed of bundles of spun glass fibers. The bundles of very fine glass fibers not shown are formed into threads which in turn are woven into the fabric in the manner well known in the textile art. The fabric is then formed into a proper shaped diaphragm, such as a sac, and suitably mounted in a container wherein the operation of dialysis takes place with the required fluid conduits placed in communication with the sac.

The diaphragm of the spun glass fabric in a dialyzing apparatus permits the crystalloids to permeate the fabric through its pores. The diaphragm is however, impermeable to the colloid of the colloidal solution to be dialyzed and thereby separates such colloids. In the rayon industry and related arts the colloid of hemicellulose and impurities are separated from the sodium hydroxide and water by a continuous process of dialysis through the diaphragm. In the process of dialysis, substances which do not permeate the diaphragm are generally referred to as the colloids and the substances which permeate the diaphragm are generally referred to as the crystalloids.

Greater strength is afforded to a diaphragm which is made of spun glass and at the same time the diaphragm is as flexible as fabric of organic threads, such as of wool or cotton. This increase of strength of the diaphragm over diaphragms of organic fibers or other membranes gives the advantage of long continuous service without break down or replacement. The need of such a strong dialyzing diaphragm has been long recognized in the art.

The fabric of spun glass fibers is as thin, or thinner, as a fabric of organic matter and therefore has all the advantages of a thin diaphragm. The action of dialysis is more complete and satisfactory through a thin walled diaphragm such as is afforded by a finely woven fabric of glass fiber. All other diaphragms of inorganic matter such as porous crockery have relatively thick walls and the action of dialysis through them is inefficient and unsatisfactory.

A dialyzing diaphragm of glass fabric has the tremendous advantage over all other diaphragms of being resistant to the chemical action of practically all of the colloidal solutions to be dialyzed other than solutions containing hydrofluoric acid. This characteristic of glass gives such a diaphragm a most universal use in the field of dialysis.

It is therefore seen that my invention provides a dialyzing diaphragm which has the maximum of desirable characteristics, some of which are unique in themselves, and which offers results heretofore unknown. My diaphragm has proper size and distribution of pores, flexibility, thinness, resistance to chemical action, and all the desired dialytic properties.

In the dialysis of certain colloidal solutions it may be desirable to modify the diaphragm composed solely of a fabric of spun glass fabrics. When the nature of the colloidal solution is such that when even more minute secondary pores in the diaphragm are required than the primary pores formed in a certain piece of glass fabric, the said fabric may be treated with a membrane material to form a supplementary membrane thereon. The choice of the membrane material utilized is dependent upon the chemical and physical characteristics of the colloidal solution to be dialyzed. In Figure 3 there is shown a modified form of diaphragm comprising the glass fabric 15 and membrane coating 18, a portion of the coating 18 being cut away to show the fabric 15.

The form of the membrane coating upon the fabric is dependent upon the nature of the membrane forming material used and its viscosity when applied. When it is desired to have the fabric entirely covered over with the membrane material so that the fabric is completely filled with the membrane material then a membrane material having the appropriate properties and viscosity is selected and applied to the fabric. The membrane coating 18 has extending therethrough a multitude of very minute secondary pores of substantially equal size uniformly distributed therein. The pores of the membrane material selected are impermeable to the colloid of the colloidal solution to be dialyzed.

Figure 4 illustrates an enlarged view of a portion of the fabric 15 in which the membrane material 18 covers threads 16 and 17 (shown in dotted lines) of the fabric 15 and completely fills the interstices between the threads of the fabric.

Figure 5 illustrates symbolically a sectional view through the coated fabric shown in Figure 4 and shows the manner in which the fabric is completely filled and coated.

For the dialysis of other colloidal solutions it is desirable to coat the threads of the fabric and to partially fill the interstices between the threads. Figure 6 illustrates an enlarged view of a portion of the fabric 15 in which the membrane material covers threads 16 and 17 (shown in dotted lines) and only partially fills the interstices between the threads of the fabric. The size of the pores formed by the interstices is thereby diminished. In addition to these primary pores of diminished size there are the very minute secondary pores in the membrane material itself. By the proper selection of membrane material and applying it in the proper state of viscosity a diaphragm having the desired characteristics of permeability and impermeability for the colloidal solution to be dialyzed is obtained. Figure 7 illustrates symbolically a sectional view through the coated fabric shown in Figure 6 and shows the manner in which each thread of the fabric is coated by the membrane material.

The space between the individual fibers of each thread is also filled by the membrane material coated to each thread. This is rather fragmentarily and diagrammatically illustrated in Figure 8 which shows the membrane material 18 impregnated between and around individual fibers 22 of a thread of the fabric 15. For simplicity of illustration only three fibers are shown in the thread. This impregnation of the membrane material within the individual threads is found in the type of coating shown in both Figures 4 and 6. Even the interstices between the fibers may thus be filled with the membrane material. The membrane material in turn has the minute secondary pores through which the action of dialysis occurs.

The coating of a membrane material upon the glass fabric provides a diaphragm of a membrane material, with the desired pore structure but with little inherent mechanical strength, supported upon a relatively strong framework made up of glass fibers and threads woven into a fabric. Therefore, the glass fabric not only acts as a dialyzing diaphragm in and of itself but also acts as a framework for supporting the relative weak and collapsible membrane material. The advantages of the particular membrane material selected may thus be utilized by combining it with the glass fabric. It is necessary of course to select a membrane material which is resistant to the chemical action of colloidal solution to be dialyzed. Some membrane material otherwise unusable because of it being likely to be weakened by the action of the colloidal solution may be utilized with advantage when combined with the fabric of my diaphragm.

Another form of dialyzing diaphragm is composed of a combination fabric of mixed inorganic and organic fibers. Organic fibers, such as for example, cotton and wool, tend to swell when in contact with the colloidal solution to be dialyzed. This characteristic may be utilized in providing a fabric in which the several interstices and spaces in the fabric are made smaller by the swelling of the fibers. It is desirable to select an organic fiber such as wool or cotton or linen which is resistant to the chemical action of the particular colloidal solution to be dialyzed. Suitable combinations or substitutions of fibers are made in accordance with the properties of the colloidal solution to be dialyzed.

The combination of the inorganic fibers and the organic fibers in one fabric may be done in several ways. In Figures 9 and 10 is illustrated the method of weaving threads of different matter together. For example, the threads 16 and 17 are composed of glass fibers. The threads 19, 20 and 21 are composed of organic fibers such as wool or cotton. In the weaving of the fabric the two types of threads are uniformly intermixed. For example, the order of threads in the warp and the weft may be glass, cotton, glass, cotton, cotton, and glass, as is the order in Figures 9 and 10. Another preferred order is strictly alternative in nature, as glass, cotton, glass, cotton. Any other suitable uniform intermingling of the glass and organic threads may be utilized so long as it is such that the fabric is substantially uniform in character throughout its area.

The combination of organic and inorganic fibers may also be done by combining the selected fibers into one thread, commonly referred to as "doubling". This type of combination is illustrated in Figures 11 and 12. For purposes of simplicity only three fibers are shown in each thread in the fabric. The fibers 22, 23, and 24 are twisted or otherwise formed into the thread 25 of which the fabric is woven. Fiber 22 is spun glass, fiber 23 may be cotton and fiber 24 may be glass or also cotton. Wool may also be substituted for the cotton in the combination. Several combinations and substitutions may be made in order to obtain the thread of the required characteristics, depending upon the properties of the colloidal solution to be dialyzed.

The combination of the organic fibers with the glass fibers in any of the above described forms provides a diaphragm having the suitable properties for dialysis of the particular colloidal solution to be dialyzed combined with the greater strength and permanence of the glass fabric. Therefore the glass fabric not only acts as a dialyzing diaphragm in and of itself but also acts as a framework for supporting the relatively weak organic fibers even when the organic fibers may be further weakened by the action of the colloidal solution.

The combination fabric of glass and of organic fibers, in any of the described forms, may also be coated with membrane material 18 just as the glass fabric may be coated. After making the combination fabric, the coating is similar to that described for the glass fabric in conjunction with Figures 3, 4, 5, 6, 7, and 8.

The choice of membrane material which may be coated upon either the glass fabric or the combination fabric is dependent upon the physical and chemical properties of the particular colloidal solution to be dialyzed. Some membrane material may be resistant to the chemical action of the colloidal solution, sometimes referred to as the sol, and another membrane material may not. Some membrane materials have the proper pore structure for the particular operation of dialysis to be performed and others have not. Therefore, the membrane materials here suggested and the process of applying them are to be selected in accordance with the particular problem of dialysis presented.

A suitable membrane material may be impregnated in the glass fabric by dipping the fabric for approximately 10 minutes in a hot solution of:

| | |
|---|---|
| Abietic anhydride (rosin) parts | 40 |
| Water do | 100 |
| Alcohol do | 12 |
| Phenol % part | ¼ |
| Formaldehyde do | ¼ |

The combination fabric is impregnated by dipping for approximately 4 hours in the same hot solution except that the abietic anhydride content is reduced to 10 parts. After being dipped both glass fabrics and combination fabrics are dried. The glass and combination fabrics thus coated and dried are impregnated with a resinous matter forming a supplementary membrane in the fabric.

In some dialyzing operations, and in particular when organic fibers in the combination fabric are subjected to the action of sodium hydroxide in the colloidal solution, it is desirable to impregnate the fabric with certain earth salts such as magnesium chloride or other salts of magnesium, or salts of neodymium, or salts of praseodymium. The glass and combination fabrics are treated with the appropriate earth salt by coating the fabric with the resinous material in the above described manner, drying the coated fabric, and then treating the coated fabric with a hot solution of the said appropriate earth salt in water or other solvent. The resinous material acts as a body for holding the earth salt thus impregnated in the fabric. By this method a diaphragm is produced having a membrane material suitably supported upon a fabric framework and the organic fibers in the fabric are protected from chemical action of the colloidal solution by the treatment with the earth salt.

An excellent membrane material is formed of cellulosic material of the type of regenerated cellulose known by the trade name of "Cellophane". While laboratory experimental use has been made of sheets of Cellophane, as a dialyzing diaphragm it has heretofore been inapplicable to commercial or extended use. The sheet of Cellophane when wet becomes fragile and weak and soon ruptures under the pressure to which it is subjected. However, the coating of regenerated cellulose upon a supporting framework as is provided by my glass and combination fabrics provides a dialyzing diaphragm for dialyzing such colloidal solutions which do not chemically attack the Cellophane.

Methods of forming regenerated cellulose are well known in the Cellophane and rayon industry. To impregnate the fabrics with regenerated cellulose a standard viscose solution suitable for the production of thin regenerated cellulose sheets is applied to the selected glass or combination fabric, and the fabric is passed through a precipitating bath of sulphuric acid or other proper acid. The fabric is then washed in water or other suitable washing material and the fabric is then desulphurized in a solution of sodium sulphide. After washing, the treated fabric may be bleached with a chlorine solution and again washed. The fabric is then finally dried and is ready for use as a dialyzing diaphragm. The coating of regenerated cellulose thus applied may be in any of the previously described forms of membrane material on the fabric, such as in Figures 4, 6, and 8.

Another membrane material appropriate to the colloidal solution to be dialyzed is a cellulosic material of the type of cellulose acetate. The selected glass or combination fabric is treated by applying to the fabric a thin solution of cellulose acetate having the desired viscosity and then evaporating the solvent of said solution. This impregnates the cellulose acetate as a membrane material in the fabric in any of the previously described forms of membrane material on the fabric, such as in Figures 4, 6, and 8.

Cellulose derivatives other than cellulose acetate may be substituted for the cellulose acetate and by following the same procedure a film of the cellulose derivative will be deposited on the selected fabric. The cellulose acetate or other cellulose derivative may be applied to the selected fabric by dipping the fabric in a solution of:

1 part of cellulose acetate in 6 parts of acetone or 1 part of cellulose derivative in 6 parts of acetone or other hydrocarbon solvent.

The excess solution is then removed and the acetone or other solvent is evaporated to leave the organic membrane film of cellulose acetate or other cellulose derivative impregnated in the fabric.

Among the cellulose derivatives which may be thus utilized are: cellulose nitrate, trinitro cellulose, dinitro cellulose, cellulose acetate, cellulose tri-acetate, cellulose di-acetate, and cellulose pentacetate.

The described membrane materials have excellent properties for dialysis. By proper selection of the membrane material to meet the physical and chemical characteristics of the colloidal solution to be dialyzed and by applying it to an appropriate glass fabric or combination fabric as described an improved dialyzing diaphragm is obtained. The membrane material impregnated in the fabric is supported throughout the area of the diaphragm and is capable of withstanding long continuous use. The selected membrane material is resistant to the chemical action of the colloidal solution to be dialyzed and retains its dialyzing nature. By proper choice of fabric and membrane material and by properly combining them to obtain a diaphragm structure suitable to the dialyzing operation to be performed there is produced a strong thin flexible dialyzing diaphragm impermeable to the colloid and permeable to the crystalloid of the colloidal solution to be dialyzed and also resistant to the chemical action of the said colloidal solution.

The described glass fabric and combination fabric have inherent desirable properties as dialyzing diaphragms not heretofore known. Combining one of said fabrics with a suitable membrane material to meet the requirements of a particular dialyzing operation produces a dialyzing diaphragm with the necessary properties together with the great advantages of said fabric.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In an apparatus utilizing osmotic forces generated by the diffusion forces of solutions for selectively controlling the movement of a crystalloid and a colloid in a colloidal solution, a dialyzing diaphragm comprising a fabric woven of threads of spun glass fibers, said fabric having a plurality of evenly distributed minute pores extending therethrough, said pores being permeable to the crystalloid and being impermeable to the colloid so that the said crystalloid may be separated from said colloid by said osmotic force, the tensile strength of said fabric withstanding the said osmotic force to restrain movement of said colloid and the stability of said glass resisting the chemical action of said colloidal solution.

2. In an apparatus utilizing the phenomena of physical dialysis by osmotic forces for the separation of the crystalloids from the colloids in a colloidal solution, a flexible diaphragm disposed in said apparatus intermediate of the colloidal solution and the separated crystalloid, said flexible diaphragm being constructed of a woven fabric having spun glass fibers uniformly distributed and inter-woven therein, said glass fibers being resistant to chemical action of said colloidal solution and affording strength and flexibility to said fabric, said fabric being finely woven to provide a plurality of evenly distributed minute pores extending therethrough, said pores being adapted to permit permeation of the crystalloids therethrough and to prevent permeation of the colloids therethrough.

3. In an apparatus utilizing osmotic forces for the selective removal of the crystalloids from the colloids in a colloidal solution non-reacting with glass, a dialyzing diaphragm positioned in the apparatus to separate the colloidal solution and the dialyzed colloid, said diaphragm comprising glass fibers woven into a thin flexible fabric, said fabric having interstices therein forming minute pores in said diaphragm, said pores being uniformly distributed over the extent of the diaphragm and impermeable to the colloid of said colloidal solution, the said fabric providing a diaphragm having the physical strength and chemical resistance of said glass fibers for dialyzing said colloidal solution.

4. In an apparatus utilizing osmotic forces generated by the diffusion forces of solutions for selectively separating the crystalloids from the colloids in a colloidal solution, a flexible diaphragm disposed in the path of the flow of the colloidal solution in said apparatus, said flexible diaphragm comprising spun glass fibers and organic fibers closely inter-woven into a thin flexible fabric, the said fabric having evenly distributed interstices therein, the said organic fibers being adapted to swell in contact with the colloidal solution to decrease the size of said interstices to form pores permeable to the crystalloid and impermeable to the colloid of said colloidal solution, the said fabric forming a strong flexible diaphragm for dialysis of said colloidal solution in said apparatus.

5. In an apparatus utilizing osmotic forces generated by the diffusion forces of solutions for selectively separating soluble substances of different ionic mobility, a flexible diaphragm disposed in the path of the flow of said substances in said apparatus, said diaphragm comprising a fabric having spun glass fibers interwoven therein, said fabric having a plurality of evenly distributed minute pores extending therethrough, said pores permitting soluble substances of one degree of ionic mobility to permeate therethrough faster than soluble substances of another degree of ionic mobility, the selective permeability of said fabric providing a diaphragm for said selective separation.

6. In an apparatus utilizing osmotic forces generated by the diffusion forces of solutions for selectively separating the crystalloids from the colloids in a colloidal solution, a flexible diaphragm disposed in the path of the flow of the colloidal solution in said apparatus, the said flexible diaphragm comprising a fabric having spun glass fibers interwoven therein, the interstices in the fabric forming primary pores therein, the fabric being impregnated with a cellulosic material having secondary pores therein, the said pores being permeable to the crystalloid and impermeable to the colloid of said colloidal solution, the said fabric forming a diaphragm in said apparatus for dialyzing the colloidal solution.

LOUIS E. LOVETT.